(12) United States Patent
Bajolet

(10) Patent No.: US 12,162,761 B2
(45) Date of Patent: Dec. 10, 2024

(54) SILICON GRANULES FOR THE PREPARATION OF TRICHLOROSILANE AND ASSOCIATED PRODUCTION METHOD

(71) Applicant: Rosi, Grenoble (FR)

(72) Inventor: Daniel Bajolet, Grenoble (FR)

(73) Assignee: ROSI, Grenoble (FR)

( * ) Notice: Subject to any disclaimer, the term of this patent is extended or adjusted under 35 U.S.C. 154(b) by 655 days.

(21) Appl. No.: 16/956,486

(22) PCT Filed: Nov. 30, 2018

(86) PCT No.: PCT/FR2018/053063
§ 371 (c)(1),
(2) Date: Jun. 19, 2020

(87) PCT Pub. No.: WO2019/122567
PCT Pub. Date: Jun. 27, 2019

(65) Prior Publication Data
US 2021/0009431 A1    Jan. 14, 2021

(30) Foreign Application Priority Data

Dec. 21, 2017  (FR) ...................................... 1762714

(51) Int. Cl.
*C01B 33/021*    (2006.01)
*C01B 33/107*    (2006.01)

(52) U.S. Cl.
CPC ........ *C01B 33/021* (2013.01); *C01B 33/1071* (2013.01); *C01P 2002/52* (2013.01); *C01P 2004/61* (2013.01); *C01P 2006/80* (2013.01)

(58) Field of Classification Search
None
See application file for complete search history.

(56) References Cited

U.S. PATENT DOCUMENTS 3,012,861 A * 12/1961 Ling ...................... C01B 33/02
                                                            428/404
4,354,987 A    10/1982 Iya
5,714,131 A *  2/1998 Margaria ................. C07F 7/16
                                                            556/472
(Continued)

FOREIGN PATENT DOCUMENTS

EP        0158563       7/1987
FR        2540483 B1    3/1986
(Continued)

OTHER PUBLICATIONS

International Search Report for International Application No. PCT/FR2018/053063 dated Mar. 21, 2019, 3 pages.
(Continued)

*Primary Examiner* — Michael Forrest
(74) *Attorney, Agent, or Firm* — TraskBritt

(57) ABSTRACT

A silicon granule, in particular, for the preparation of trichlorosilane, having a size of between 10 and 500 microns, and comprising: dopants in a weight fraction of less than 5 ppm; at least one co-catalyst selected from copper, iron, aluminum and calcium, in a weight fraction of between 1 and 2500 ppm; and metallic impurities, with exclusion of the at least one co-catalyst, in a weight fraction of less than 50 ppm.

9 Claims, 2 Drawing Sheets

(56) References Cited

U.S. PATENT DOCUMENTS

| | | | |
|---|---|---|---|
| 5,871,705 A * | 2/1999 | Sakata | C01B 33/10757 |
| | | | 423/342 |
| 2004/0047794 A1 | 3/2004 | Pfaffelhuber et al. | |
| 2004/0101463 A1 * | 5/2004 | Bulan | C01B 33/10763 |
| | | | 423/342 |
| 2005/0082400 A1 * | 4/2005 | Yamauchi | B08B 7/0092 |
| | | | 241/23 |
| 2005/0135986 A1 | 6/2005 | Weidhaus et al. | |
| 2010/0278707 A1 | 11/2010 | Hoffmann | |
| 2013/0319391 A1 * | 12/2013 | Hariharan | B28D 5/045 |
| | | | 423/350 |
| 2017/0137296 A1 * | 5/2017 | Kim | C01B 33/06 |

FOREIGN PATENT DOCUMENTS

| | | | | |
|---|---|---|---|---|
| FR | 2562056 A1 | 6/1986 | | |
| WO | WO-2006031120 A1 * | 3/2006 | | C01B 33/025 |
| WO | WO-2007035108 A1 * | 3/2007 | | C01B 33/03 |
| WO | 2010/127669 A1 | 11/2010 | | |
| WO | WO-2012152434 A1 * | 11/2012 | | B01J 2/04 |

OTHER PUBLICATIONS

International Written Opinion for International Application No. PCT/FR2018/053063 dated Mar. 21, 2019, 9 pages.
Lombardi et al., High Yield Recycling Process of Silicon Kerf from Diamond Wire Wafering, 24th European Photovoltaic Solar Energy Conference, (Sep. 21-25, 2009, pp. 1256-1258.

* cited by examiner

| % in mass or ppm in mass | Si % | Fe % | Al % | Ca % | Ti ppm | P ppm | B ppm | C ppm | size |
|---|---|---|---|---|---|---|---|---|---|
| Max | | 0.55 | 0.3 | 0.1 | 500 | 100 | 70 | 400 | 45-500μm |
| Min | | 0.45 | 0.1 | 0.04 | 200 | 70 | 50 | 300 | |
| Mean | 99.3 | 0.5 | 0.2 | 0.07 | 300 | 80 | 60 | 350 | |

FIG. 1

| | B | P | Fe | Al | Ca | Ti | Ni | Cr | Zn | C | O | size |
|---|---|---|---|---|---|---|---|---|---|---|---|---|
| ppm in mass | 0.4 | 2 | 20 | 40 | 180 | 1 | 40 | 2 | 2.6 | 280 | 28 | 10 - 500 μm |

FIG. 2A

| | B | P | Fe | Al | Ca | Ti | Ni | Cr | Zn | C | O | size |
|---|---|---|---|---|---|---|---|---|---|---|---|---|
| ppm in mass | 0.4 | 2 | 0.1 | 2000 | 100 | 1 | 40 | 2 | 2.6 | 280 | 28 | 10 - 500 μm |

FIG. 2B

| | B | P | Fe | Al | Ca | Ti | Ni | Cr | Zn | C | O | size |
|---|---|---|---|---|---|---|---|---|---|---|---|---|
| ppm in mass | 0.4 | 2 | 1200 | 1000 | 100 | 1 | 40 | 2 | 2.6 | 280 | 28 | 50 - 500 μm |

FIG. 2C

| % in mass or ppm in mass | B ppm | P ppm | Fe ppm | Al ppm | Ti ppm | Ni ppm | Cr ppm | Zn ppm | C % | O % | size |
|---|---|---|---|---|---|---|---|---|---|---|---|
| | 0.4 | 2 | 20 | 40 | 1 | 40 | 2 | 2.6 | 0.1 | 1 | d50~4μm |

FIG. 3

SILICON GRANULES FOR THE PREPARATION OF TRICHLOROSILANE AND ASSOCIATED PRODUCTION METHOD

CROSS-REFERENCE TO RELATED APPLICATIONS

This application is a national phase entry under 35 U.S.C. § 371 of International Patent Application PCT/FR2018/053063, filed Nov. 30, 2018, designating the United States of America and published as International Patent Publication WO 2019/122567 A1 on Jun. 27, 2019, which claims the benefit under Article 8 of the Patent Cooperation Treaty to French Patent Application Serial No. 17/62714, filed Dec. 21, 2017.

TECHNICAL FIELD

The present disclosure relates to the silicon production line for the photovoltaic industry. It relates, in particular, to granules of silicon, resulting from the recycling of waste from the cutting of silicon ingots ("kerfs") and, in particular, suitable for the preparation of trichlorosilane (TCS).

BACKGROUND

The production chain for high purity silicon required for the photovoltaic industry is a complex succession of metallurgical and chemical processes.

The initial material, metallurgical silicon (MG-Si, for "metallurgical grade silicon"), comes from a carboreduction reaction of quartz mixed with reducers such as reactive hard coal or charcoal, always accompanied by wood. The mixture is brought to very high temperatures in an electric arc furnace. It undergoes various refinements until solidified metallurgical silicon is obtained, either in the form of ingots, which will then be crushed, or in the form of granules, of a few hundred microns in average diameter. Metallurgical silicon has many impurities:
- of metallic type (Fe, Al, C, Ti, etc.), in proportions well above 200 ppm (ppm: part per million by mass);
- of doping type, for example, phosphorus (P) and boron (B), in proportions greater than 20 ppm;
- organic (C) or oxygen (O) type, in proportions greater than 100 ppm.

This level of impurities being incompatible with the specifications of photovoltaic silicon, the granules or pieces of metallurgical silicon are then treated chemically, by chlorination or hydrochlorination; at the end of these chemical processes, a gaseous compound containing silicon is obtained: trichlorosilane ($HSiCl_3$, known as TCS).

The chlorination process takes place in a fluid bed reactor, in which the granules or crushed MG-Si are brought into contact with hydrogen chloride gas. The temperature and the pressure in the reactor are, respectively, on the order of 300° C. and 4 bars. At the end of the chlorination process, TCS is formed in the majority proportion; silicon tetrachloride (STC) and other chlorinated compounds containing silicon or impurities are also formed.

The alternative hydrochlorination process also takes place in a fluid bed reactor, at a higher temperature and pressure (450° C., 10 to 50 bars). The metallurgical silicon granules or crushed silicon are brought into contact with STC ($SiCl_4$) and hydrogen. At the outlet, TCS is formed in a smaller proportion compared to the chlorination reaction; other chlorinated compounds containing silicon or impurities are also produced.

The "impure" TCS from one or other of the chlorination or hydrochlorination processes is then purified by a succession of distillation steps. These steps are extremely long and represent a high share of the investment and operating costs in the silicon production chain. In particular, dopant type impurities (P, B) are very difficult to remove and a high reflux rate (typically greater than 100) in the distillation columns is necessary to achieve the required purity of the TCS.

The purified TCS can then be transformed into pieces or grains of high purity silicon constituting the raw material for the drawing of ingots of photovoltaic quality (PV). This raw material is commonly called PCS (Poly Crystalline Silicon).

A first way to form the PCS consists in the decomposition of the TCS at high temperature (around 1200° C.) in a Siemens bell reactor ("bell jar reactor"); the silicon is gradually deposited on a filament placed inside the reactor, forming at the end of the process a silicon bar with a typical purity of 6N (>99.9999%) to 11N. The high purity bar is then crushed to give large pieces of silicon ("chunks") which will be melted for the drawing of ingots.

An alternative route consists of transforming the TCS into a monosilane ($SiH_4$) and then decomposing the monosilane in a fluid bed reactor. $SiH_4$ put in contact with fine silicon seeds allows the formation of high purity silicon grains. Silicon grains larger than 400 microns can be melted with chunks for the drawing of photovoltaic grade ingots. The silicon grains of size less than 400 microns, which represent approximately 10% of the production, cannot be used, in particular, because of the flights, incompatible with the electrical and mechanical components of the equipment for the drawing of the ingots and because of their high proportion of oxide which reduces the efficiency of the drawing processes.

The PV grade silicon ingots then undergo several cutting steps: first, cutting the blanks of the ingot to define a rectangular block, and secondly cutting the ingot into slices. These cuts are the source of significant losses (kerf), on the order of 40 to 50% of the raw material of high purity silicon.

Traditionally, cutting was carried out by sawing with an abrasive based on SiC and an organic lubricant (PEG for polyethylene glycol). Document WO2010127669 provides a solution for recycling kerfs from this type of cutting. According to the method described, the solid components of kerfs comprising portions of silicon with the required purity are compacted and shaped into granules having an appropriate size; these granules are then introduced into a reactor with hydrogen chloride so as to obtain trichlorosilane (TCS) and silicon tetrachloride, the ferrous components of the kerfs are converted into iron chloride, while the portions of SiC present collect in the lower part of the reactor in the form of dust.

In practice, kerfs containing a majority of SiC compared to silicon (two thirds or more) are very difficult to treat and the industrial implementation of the solutions proposed is complex. The agglomeration of very fine particles (called "fines") by a binder is not effective at reaction temperatures and the very fine particles leave the fluid bed immediately. Finally, the accumulation of SiC slows down very quickly the productivity of the reactor.

For a few years, the cutting of PV grade silicon ingots has been carried out with a diamond wire, with water or PEG being used as lubricants. The waste (kerfs) is mainly made of silicon, with some impurities linked to the wear of the diamond wire. There is therefore a growing interest in recovering and recycling these kerfs to reintroduce the silicon they contain in the production chain of photovoltaic silicon.

BRIEF SUMMARY

The present disclosure relates to an alternative solution for recycling silicon waste. The present disclosure relates, in particular, to silicon granules resulting from the recycling of kerfs and, in particular, suitable for the preparation of TCS. The present disclosure also relates to a production method for silicon granules.

The present disclosure relates to a silicon granule, in particular, suitable for the preparation of trichlorosilane (TCS), which has a size between 10 and 500 microns, and which comprises:
- dopants, including phosphorus or boron, in a mass fraction of less than 5 ppm;
- at least one co-catalyst, chosen from iron, aluminum and calcium, in a mass fraction of between 1 and 2500 ppm;
- metallic impurities, excluding the at least one co-catalyst, in a mass fraction of less than 50 ppm.

According to other advantageous and non-limiting features of the present disclosure, taken alone or in combination:
- the mass fraction of oxygen is less than 100 ppm.

The present disclosure also relates to a pulverulent preparation comprising silicon granules as above. The average size of the granules in the pulverulent preparation is between 50 and 400 microns.

According to a particular embodiment, the size of the silicon granules in the pulverulent preparation is greater than 50 microns.

The present disclosure also relates to a production method for silicon granules as described herein, comprising:
- a) A step of supplying silicon waste from the cutting of photovoltaic quality ingots by diamond wire, the waste comprising silicon particles covered with an oxide layer and mixed with impurities in an aqueous medium, and/or a step of supplying crushed silicon waste from downgraded substrates of the microelectronics or photovoltaic industry, the waste comprising silicon particles covered with an oxide layer and mixed with impurities;
- b) A step of chemical treatment of the waste to separate the silicon particles from all or part of the impurities, and to dry the silicon particles to form a powder;
- c) A metallurgical treatment step of the powder to melt the silicon particles and form a liquid silicon bath;
- d) A step of introducing at least one co-catalyst into the liquid silicon bath, in an amount such that the mass fraction of the co-catalyst in the granules is between 1 and 2500 ppm;
- e) A step of solidifying the liquid silicon to form the silicon granules.

According to other advantageous and non-limiting features of the present disclosure, taken alone or in any technically feasible combination:
- step e) comprises a granulation step by rapid cooling of drops of liquid silicon;
- step e) comprises pouring the liquid silicon into an ingot mold configured to allow rapid cooling, to form a block of solidified silicon;
- the solidified silicon block is crushed to form the silicon granules;
- the production method comprises a step f) of separation by sieving or by flight, to sort the silicon granules by size;
- in step d), the at least one co-catalyst, chosen from iron, aluminum and calcium, is introduced in the form of a metal or a metal alloy into the liquid silicon bath;
- step a) comprises the supply of silicon grains of size less than 400 microns, coming from a fluid bed reactor based on the decomposition of monosilane, the grains being mixed with the silicon waste;
- in step c), silicon grains of size less than 400 microns, coming from a fluid bed reactor based on the decomposition of monosilane, are melted with the powder of the silicon particles;
- step a) comprises the supply of downgraded substrates from the microelectronic or photovoltaic industry, crushed and mixed with the silicon waste resulting from the cutting by diamond wire of ingots of photovoltaic quality;
- in step c), crushed pieces of downgraded substrates from the microelectronics or photovoltaic industry are melted with the powder of the silicon particles.

The present disclosure finally relates to a process for obtaining trichlorosilane (TCS) by chlorination or by hydrochlorination, using a pulverulent preparation as described herein.

BRIEF DESCRIPTION OF THE DRAWINGS

Other features and advantages of the present disclosure will emerge from the detailed description of example embodiments of the present disclosure, which will follow with reference to the appended figures wherein:

FIG. 1 is a table showing the typical composition of metallurgical silicon according to the state of the art, composition measured by luminescent discharge mass spectrometry;

FIGS. 2A, 2B, and 2C are tables show examples of compositions of silicon granules in accordance with the present disclosure, composition measured by luminescent discharge mass spectrometry;

FIG. 3 is a table showing the typical composition of silicon particles in a powder resulting from the chemical treatment step of the production method according to the present disclosure, composition measured by luminescent discharge mass spectrometry;

DETAILED DESCRIPTION

Figure 4:
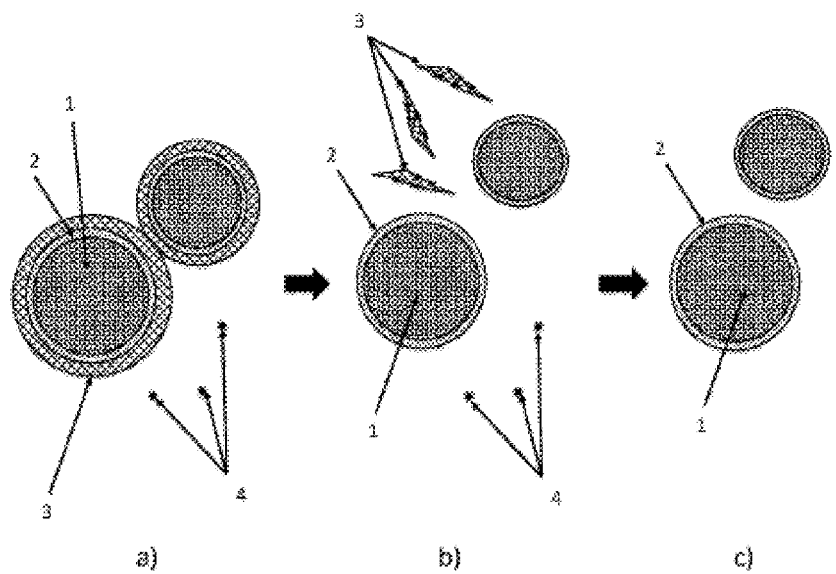
FIG. 4 schematically shows the chemical treatment step of the production method according to the present disclosure.

The present disclosure relates to a silicon granule specially adapted for optimizing the production of trichlorosilane (TCS), in chlorination or hydrochlorination processes.

The term "granule" in the context of the present disclosure must be understood in the broad sense, that is to say corresponding to a grain or particle of small size, capable of having different shapes, in particular, spherical, rounded, elongated or angular.

The silicon granule according to the present disclosure has a size of between approximately 10 microns and approximately 500 microns. What is called granule size here is its "equivalent Sauter diameter." The "equivalent Sauter diameter" is the diameter of the sphere, which would behave identically during a granulometric measurement by a defined technique. Mention may, in particular, be made, by way of example, of a measurement technique by laser diffraction of the Malvern type.

The silicon granule comprises a small amount of dopants, in particular, dopants of the phosphorus and boron type; each dopant represents a mass faction of less than 5 ppm. Note that the unit "ppm" (parts per million) will be used in the following description as always relating to a mass fraction.

Advantageously, the silicon granule also contains a small quantity (less than 5 ppm) of other dopants, for example, arsenic, antimony.

The silicon granule according to the present disclosure also comprises at least one co-catalyst chosen from iron, aluminum and calcium, the mass fraction of which is adjustable between 1 and 2500 ppm, advantageously between 100 and 2000 ppm. The co-catalyst is an impurity whose presence is necessary in the silicon matrix to promote, in particular, a chlorination or hydrochlorination reaction. These co-catalysts are generally present in intermetallics, at the grain boundaries of silicon.

The metallic impurities, apart from the at least one co-catalyst, such as, for example, titanium, nickel, zinc, chromium, magnesium, manganese, vanadium, etc., are present in the silicon granule, in small quantity, corresponding to mass fractions for each impurity less than 50 ppm, even less than 30 ppm, or even less than 10 ppm.

A pulverulent preparation comprising silicon granules according to the present disclosure is particularly favorable for the production of TCS by the chlorination or hydrochlorination processes, for the reasons that are explained below.

On the one hand, the low mass fractions of dopants and metallic impurities (except co-catalysts) contained in the silicon granules make it possible to drastically limit the number of distillation cycles necessary for the purification of TCS. The distillation of phosphorus and boron compounds is particularly long and complex: granules or crushed metallurgical silicon usually used as input material for chlorination or hydrochlorination processes typically contain 70 to 100 ppm of phosphorus and 50 to 70 ppm of boron (FIG. 1). The silicon granules according to the present disclosure comprise less than 5 ppm of each of these dopants. FIG. 2A presents a table illustrating an example of the composition of a silicon granule according to the present disclosure, measured by glow discharge mass spectrometry (GDMS): boron is present at 0.4 ppm and phosphorus at 2 ppm is more than 30 times lower than in metallurgical silicon. The TCS made from this type of granule is therefore much simpler and quicker to purify.

On the other hand, the reactivity of the silicon granules in the fluid bed, during the chlorination and hydrochlorination reactions, is a function of several parameters other than pressure and temperature, in particular:
- the content of the granules in certain "useful" impurities, which must then be considered as co-catalysts, and
- the nature and quantity of catalysts added, in the fluid bed, to the reactive mass, that is to say to the silicon granules.

As previously indicated, the following reaction takes place in chlorination: $Si+HCl \rightarrow TCS+STC+$impurities and co-products.

In hydrochlorination, the reaction is as follows: $Si+2H_2+3STC \rightarrow 4TCS+$impurities and co-products.

The presence of specific co-catalysts in the form of intermetallic compounds in the silicon granules and in selected proportions allows a more effective activation of the chemical reaction of chlorination or hydrochlorination.

In chlorination, the most commonly used catalyst is copper. The aluminum and iron contents of the granules of the pulverulent preparation according to the present disclosure are then optimized to obtain the maximum reaction rate and the highest TCS selectivity.

A pulverulent preparation suitable for a chlorination process will advantageously have a limited iron content, since iron slows down the selectivity in TCS. The granules of the pulverulent preparation may, for example, have the composition of the table of FIG. 2B.

In hydrochlorination, the most active co-catalysts will be iron and aluminum, the amounts of iron having to be significantly higher than for chlorination. Copper is also commonly used to catalyze the reaction.

For example, a pulverulent preparation suitable for a hydrochlorination process may have the composition of the table of FIG. 2C. Advantageously, with silicon with a low aluminum content (for example, 1000 ppm), copper chloride can be introduced in the form of microbeads whose d50 is approximately 50 directly in the fluid bed reactor, to improve the efficiency of the reaction.

According to the present disclosure, the silicon granules comprise the (at least one) co-catalyst in a mass fraction of between 1 and 2500 ppm so as to catalyze efficiently, but without unnecessarily re-polluting the silicon: the production method for the TCS starting from this type of granule is thus more efficient, thanks to improved reactivity and faster purification, allowing significant gains in energy and production capacity.

Advantageously, the average size of the silicon granules in the pulverulent preparation is between 50 and 400 microns. By average size, also called d50, is meant the size that is greater than the size of 50% by volume of the granules and less than the size of 50% by volume of the granules.

The reactivity of the silicon granules in the fluid chlorination or hydrochlorination bed is also a function of the specific surface of the particles, linked to their d50. A d50 of between 50 and 400 microns is perfectly suited to a chlorination process.

For use in a hydrochlorination process, the pulverulent preparation according to the present disclosure contains only silicon granules of size greater than 50 microns, the finer granules being incompatible with the hydrochlorination process for practical reasons of clogging heat exchangers.

The silicon granules according to the present disclosure are particularly suitable for the production of TCS by chlorination or hydrochlorination, in that they have a size and a chemical composition favoring the efficiency and the reactivity of the chlorination and hydrochlorination reactions in a fluidized bed; the low content of dopants and metallic impurities "not useful for the reaction" (that is to say excluding co-catalysts) also limits the subsequent steps for purifying the TCS.

The suitability therefore results from a combination of the size of the granules and their chemical composition, parameters that can be optimized and adjusted according to the particularities of each chlorination or hydrochlorination process.

According to another advantageous aspect, the mass fraction of oxygen contained in the silicon granules is less than 100 ppm. The oxygen comes essentially from the oxide layer, which usually covers the silicon granules. An oxide layer as thin as possible will promote the reactivity of the chemical reaction in the fluid bed of the chlorination or hydrochlorination process, because the catalyst will be more quickly in contact with a silicon surface and, in particular, with intermetallics (from co-catalysts).

To maintain a low oxygen content, the pulverulent preparation according to the present disclosure is advantageously packaged under a neutral atmosphere, for example, under nitrogen, thus limiting any contact with an oxygen-rich atmosphere capable of oxidizing the silicon granules.

The present disclosure also relates to a production method for silicon granules.

The production method comprises a step a) of supplying silicon waste (kerfs) resulting from the cutting by diamond wire of ingots of photovoltaic quality. The waste comprises silicon particles covered with an oxide layer and mixed with impurities in an aqueous medium; these impurities include metallic particles and potentially organic additives.

According to a particular embodiment, step a) may also include the supply of silicon grains from a fluid bed reactor based on the decomposition of monosilane. Preferably, it is the grains of size less than about 400 microns, which will be supplied in step a), these being incompatible with the processes for drawing PV ingots, as previously mentioned. These grains can be mixed with the silicon waste (kerfs) in step a) of the process. Note that these grains could alternatively be used alone (not mixed with kerfs) and undergo the subsequent stages of the production method.

According to another particular mode of implementation, step a) can comprise the supply of downgraded substrates from the microelectronic or photovoltaic industry. By downgraded substrate is meant silicon-based substrates removed from a production line due to breakage, defect or other non-compliance, or end-of-life substrates, and capable of being recycled. For example, these downgraded substrates could be monocrystalline or polycrystalline silicon wafers comprising uniform or patterned insulating or metallic layers forming all or part of components, SOI (silicon on insulator) wafers, defective solar panels or end of life, etc.

These downgraded substrates can be crushed and continue the subsequent steps of the process according to the present disclosure, or they can be mixed with the silicon waste (kerfs) in step a) of the process before continuing the process steps.

The production method then includes a step b) of chemical treatment of the material supplied in step a). This step b) aims on the one hand, to separate the silicon particles from all or part of the impurities, and on the other hand, to dry the silicon particles so as to form a powder.

The silicon waste (kerfs) is in the form of a suspension of approximately 5% of silicon particles and metallic particles in an aqueous liquid supplemented with soluble organic additives such as PEG for example. A first operation usually consists in roughly separating the liquid fraction, which could possibly be recycled on the cutting system. The residual pasty mixture then typically comprises silicon particles 1 covered with an oxide layer 2 and a layer of organic compounds 3, and metal particles or ions 4 (FIG. 4, panel a)). This pasty mixture then undergoes the chemical treatment step, the sequences of which are as follows:

Disperse impurities 4 such as metals or particles from ingot supports resulting from cutting with diamond wire and organic compounds 3 (FIG. 4, panel b));

Filter the silicon particles 1 from the solid phase to remove liquid and impurities (FIG. 4, panel c));

Repeat the operation to obtain an agglomerate of silicon particles containing very little polluting residues (impurities);

Treat the agglomerate of silicon particles 1 with a chemical solution minimizing or reducing the oxide layer 2 located on the surface of the particles 1, by "etching". In particular, solutions based on hydrofluoric acid may be applied to the agglomerate, then subjected to several rinsing cycles with water;

Dry the agglomerate under an inert atmosphere in order to obtain a dry powder, advantageously stored under an inert atmosphere.

These chemical treatment sequences may, in particular, be carried out according to chemical processes of the state of the art such as, for example, that described by Lombardi in the publication entitled "High yield recycling process of silicon kerf from diamond wire wafering" (24th European Photovoltaic Solar Energy Conference, Sep. 21-25, 2009, Hamburg, Germany).

Figure 5:
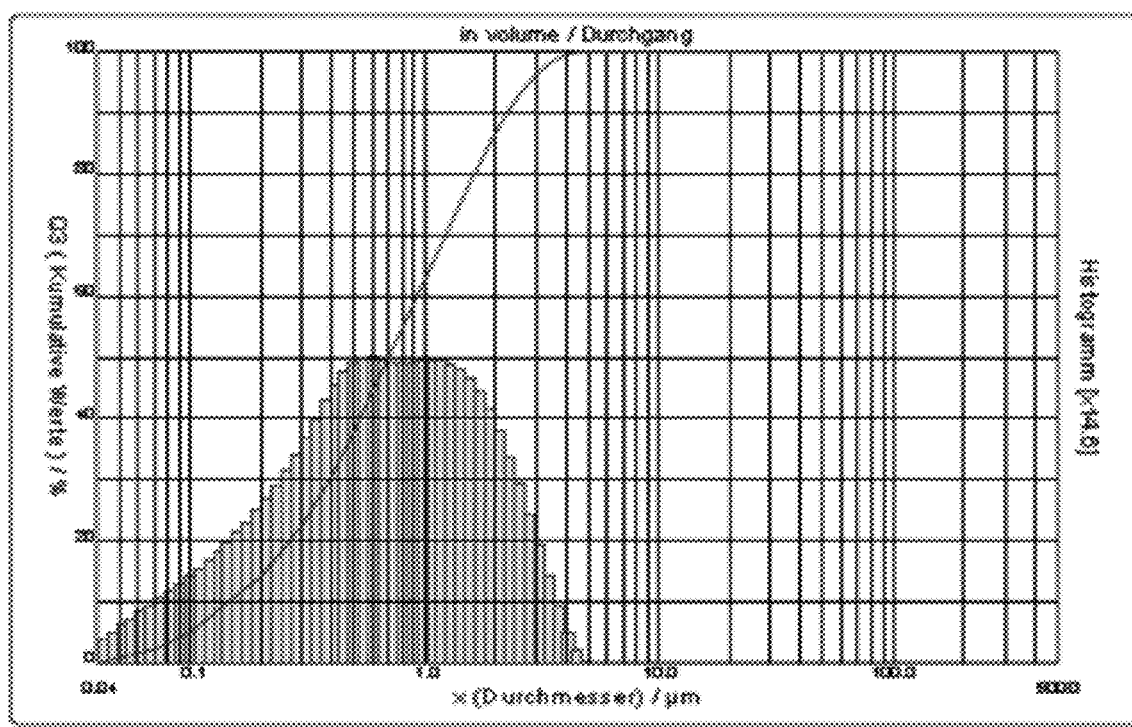
FIG. 5 shows an example of the size distribution of silicon particles in a powder resulting from the chemical treatment step of the production method according to the present disclosure.

The result of this step b) of chemical treatment is a very fine powder, having a distribution in particle size substantially Gaussian typically centered on 1 micron (d50 of the order of 1 micron), as illustrated by way of example on FIG. 5. The typical chemical composition of this powder is illustrated in the table of FIG. 3. Its level of purity is very good: on the one hand, because the silicon particles come from the cutting of ingots of high purity and, on the other hand, because the chemical treatment made it possible to isolate the silicon particles from the most of the impurities (metallic particles and organic additives) present in the cutting waste.

In the particular embodiment where downgraded substrates are introduced as silicon waste in step a), the downgraded substrates may undergo a step b) of chemical treatment allowing the removal of all or part of the surface layers that they include. This step may include known sequences of dry or wet etchings of the layers, rinsing and drying of the downgraded substrates. They will then be crushed to undergo, alone or mixed with the powder of the silicon particles obtained from other waste, the following step c) of the production method.

The production method then includes a step c) of metallurgical treatment of the very fine powder obtained in step b). Step c) aims to melt the silicon particles of the powder and to form a liquid silicon bath.

The fusion of very fine silicon particles is complex to carry out industrially. The increase in the specific surface area with the decrease in d50 and the presence of a highly insulating layer of silicon oxide ($SiO_2$) on the surface of the particles make the operation delicate. Different fusion methods are proposed in the prior art, in particular, in documents U.S. Pat. No. 4,354,987 and EP0158563 and could be used in the context of the present disclosure.

According to an advantageous embodiment of the present disclosure, the metallurgical treatment of the powder is carried out in melting equipment with induction heating, equipped with a graphite crucible. The temperature of the crucible can be increased to around 1500° C. The fine powder of silicon particles is introduced into the crucible through an upper opening. The silicon forming the particles will melt and flow from the "shell" formed by the oxide layer to feed a bath of liquid silicon. The oxide, remaining in the solid state, will agglomerate and float in the liquid silicon bath. At least one orifice provided at the crucible allows the continuous flow of liquid silicon in a channel provided for this purpose. The liquid silicon at the outlet of this channel may be shaped, as discussed subsequently herein.

According to a particular embodiment, in step c), silicon grains, advantageously of size less than 400 microns, coming from a fluid bed reactor based on the decomposition of monosilane, can be melted with the powder of the silicon particles or molten alone. This allows an effective reintroduction of these small grains (10% of the production as mentioned in the introduction) in the production line of PV silicon by fluid bed.

The production method also includes a step d) of introducing into the liquid silicon bath, at least one co-catalyst chosen from aluminum, iron and calcium. This step aims to optimize the content of one or more co-catalyst(s) in the silicon granules resulting from the production method.

This optimization is done by controlled additions in the liquid silicon bath, avoiding the addition of dopants (phosphorus and boron) or other metallic impurities "not useful" (in particular, for chlorination or hydrochlorination processes) and not desired in the final PCS silicon. The nature of the co-catalyst(s) introduced and the quantity depend on the intended use of the silicon granules, in particular, for chlorination or hydrochlorination, and on the specific conditions for implementing these processes.

Step d) makes it possible to adjust the nature and the quantity of co-catalyst(s) mixed with the liquid silicon bath, and thus to adjust the mass fraction of co-catalyst(s) in the silicon granules obtained from the production method according to the present disclosure; such an adjustment makes it possible to optimize the reaction rate of the chlorination or hydrochlorination processes and to increase the selectivity in TCS and the purity of the TCS produced.

The optimal amounts of co-catalyst(s) are advantageously introduced by dosing into the liquid silicon bath, in the form of metal (Al, Fe) or in the form of an alloy (for example, FeSi, SiCa, etc.).

The at least one co-catalyst is introduced at the level of 1 to 2500 ppm as mass fraction of the liquid silicon, i.e., in an amount such that its mass fraction in the silicon granules resulting from the production method is between 1 and 2500 ppm; advantageously the mass fraction of the co-catalyst is chosen between 100 and 2000 ppm. As stated previously, the mass fraction of co-catalyst in the granules is adjusted according to the specifics of the chlorination or hydrochlorination process targeted.

The production method then comprises a step e) of solidification of the liquid silicon aimed at forming the silicon granules.

According to a first embodiment, step e) comprises a granulation step by rapid cooling of the drops of liquid silicon leaving the channel of the melting equipment. The silicon drops fall on a cold surface and undergo a centrifugal force to be dispersed before their regrouping in a pulverulent preparation: their solidification (quenching) is rapid, which ensures a uniform concentration of the co-catalyst(s) as intermetallic compounds in the granules. The size of the granules will essentially depend on the size of the drops of liquid silicon and on the speed of centrifugation. The granulation step is carried out under a neutral atmosphere (for example, argon) so as to avoid or at least limit the oxidation of the silicon granules.

According to a second embodiment, step e) comprises the pouring of the liquid silicon through the channel of the melting equipment, into an ingot mold configured to allow rapid cooling, so as to form a block of solidified silicon. In practice, the mold has a high thickness (for example, 15 cm of cast iron A 319) while the solidified silicon block is of low thickness (for example, 5 cm), which ensures rapid cooling and therefore a relatively uniform concentration of co-catalyst(s) (in the form of intermetallic compounds) in the solidified silicon block. Step e) then comprises a step of crushing the solidified silicon block, under a nitrogen atmosphere, to form the silicon granules.

The production method according to the present disclosure may also comprise a step f) of separation by sieving or by flight, to sort the silicon granules by size. It is thus possible to assemble pulverulent preparations of silicon granules whose average size (d50) is between 50 and 400 microns. For certain specific uses (in particular, for hydrochlorination processes), this separation step makes it possible to assemble powdery preparations devoid of silicon granules of size less than 50 microns.

Naturally, the present disclosure is not limited to the embodiments and to the examples described, and it is possible to make variant embodiments without departing from the scope of the invention as defined by the claims.

The invention claimed is:

1. A method for the production of silicon granules, comprising:
   a) a step of supplying silicon waste from the cutting of photovoltaic quality ingots by diamond wire, the waste comprising silicon particles covered with an oxide layer and mixed with impurities in an aqueous medium;
   b) a step of chemical treatment of the waste to separate the silicon particles from all or part of the impurities, and to dry the silicon particles to form a powder;
   c) a metallurgical treatment step of the powder to melt the silicon particles and form a liquid silicon bath;
   d) a step of introducing co-catalysts consisting of iron, aluminum, and calcium into the liquid silicon bath, in an amount such that a total mass fraction of the co-catalysts in the granules is between 160 and 2300 ppm; and
   e) a step of solidifying the liquid silicon to form the silicon granules by rapid cooling to ensure a uniform concentration of the co-catalysts as intermetallic compounds in the silicon granules, the silicon granules having a size between 10 and 500 microns, and comprising:
      dopants, including phosphorus or boron, in a mass fraction of less than 5 ppm;
      the co-catalysts with a total mass fraction between 160 and 2300 ppm; and
      metallic impurities, excluding the co-catalysts, in a mass fraction of less than 50 ppm, wherein the method further comprises:
   mixing crushed substrates with the silicon waste from the cutting of photovoltaic quality ingots by diamond wire in step a); or
   melting crushed substrates with the silicon powder in step c); or both.

2. The method of claim 1, wherein step e) comprises a granulation step of rapid cooling of drops of the liquid silicon.

3. The method of claim 1, wherein step e) comprises pouring the liquid silicon into an ingot mold configured to allow rapid cooling, to form a solidified silicon block.

4. The method of claim 3, wherein the solidified silicon block is crushed to form the silicon granules.

5. The method of claim 1, further comprising a step f) of separation by sieving or by flight, to sort the silicon granules by size.

6. The method of claim 1, wherein, in step d), the co-catalysts are introduced in the form of metal or metal alloy in the liquid silicon bath.

7. The method of claim 1, wherein step a) comprises supplying silicon grains of size less than 400 microns, coming from a fluid bed reactor based on the decomposition of monosilane, the grains being mixed with silicon waste.

8. The method of claim 1, wherein, in step c), silicon grains of size less than 400 microns, coming from a fluid bed reactor based on the decomposition of monosilane, are melted with the powder of the silicon particles.

9. A method for the production of silicon granules, comprising:
- supplying silicon waste from the cutting of photovoltaic quality ingots by diamond wire, the silicon waste comprising silicon particles and impurities in an aqueous medium;
- separating the silicon particles from all or part of the impurities;
- melting the silicon particles and forming a liquid silicon bath;
- introducing co-catalysts consisting of iron, aluminum, and calcium into the liquid silicon bath, in an amount such that a total mass fraction of the co-catalysts in silicon granules is between 100 and 2500 ppm; and
- solidifying the liquid silicon to form the silicon granules, by rapid cooling to ensure a uniform concentration of the co-catalysts as intermetallic compounds in the silicon granules, the silicon granules having a size between 10 and 500 microns, and comprising:
  - dopants, including phosphorus or boron, in a mass fraction of less than 5 ppm;
  - the co-catalysts with a total mass fraction between 100 and 2500 ppm; and
  - metallic impurities, excluding the co-catalysts, in a mass fraction of less than 50 ppm.

* * * * *